(12) United States Patent
Maier (10) Patent No.: US 7,358,720 B1
(45) Date of Patent: Apr. 15, 2008

(54) PROXIMITY SENSOR INTERFACE

(75) Inventor: Lawrence Carl Maier, New Haven, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 143 days.

(21) Appl. No.: 11/339,181

(22) Filed: Jan. 25, 2006

(51) Int. Cl.
*G01B 7/14* (2006.01)

(52) U.S. Cl. ............................. 324/207.26

(58) Field of Classification Search ............
324/207.15–207.18, 207.23–207.26, 326, 324/222, 225
See application file for complete search history.

(56) References Cited

U.S. PATENT DOCUMENTS

| | | |
|---|---|---|
| 4,219,740 A | 8/1980 | Little |
| 5,180,978 A | 1/1993 | Postma et al. |
| 5,313,020 A * | 5/1994 | Sackett .................... 174/113 C |
| 6,424,146 B2 * | 7/2002 | Demma et al. ......... 324/207.16 |
| 6,664,782 B2 * | 12/2003 | Slates ..................... 324/207.16 |
| 2003/0132756 A1 * | 7/2003 | Nomura et al. ............. 324/522 |

* cited by examiner

*Primary Examiner*—Reena Aurora
*Assistant Examiner*—Kenneth J Whittington
(74) *Attorney, Agent, or Firm*—Muirhead and Saturnelli, LLC (57) ABSTRACT

A first measured value is determined which is associated with the proximity of a target to an inductive sensor. A first voltage signal having a first amplitude is generated. The first voltage signal is provided as a driving signal to the inductive sensor. A sensor current signal is received as a return signal output from the inductive sensor. The sensor current signal has an amplitude proportional to a proximity of the target to the inductive sensor. The sensor current signal is converted to a corresponding second voltage signal having a second amplitude. A differential measuring technique is used to determine the first measured value in accordance with relative amplitudes of said first voltage signal and said second voltage signal.

38 Claims, 6 Drawing Sheets

PROXIMITY SENSOR INTERFACE

BACKGROUND

1. Technical Field

This application generally relates to inductive sensing, and more particularly to inductive sensing to measure the proximity of a target object.

2. Description of Related Art

Different sensing techniques may be used in connection with proximity sensors to determine the proximity of a target. Inductive sensing techniques may be used with a proximity sensor that detects the proximity of a metal target. Depending on the closeness of the metal target, the magnetic characteristics of the sensor change. Proximity sensors may be used in a variety of different applications and environments. One example application and use of a proximity sensor is in the aviation industry. Proximity sensors may be used in ascertaining a particular position of airplane components. For example, a metal target may be located on a component. The proximity sensor may be used to determine magnetic characteristics based on the proximity of the sensor to the metal target located on the component. Depending on the characteristics detected by the sensor, a determination may be made regarding the proximity of the component to the sensor.

Environmental and other conditions may affect the operation and reliability of the proximity sensor and other components included in a system. Within an airplane and other operating environments in which the proximity sensor and associated components may operate, there may be electrical interference or noise. Such electrical interference may be due to radio signals, radar, and the like, in accordance with the environment. Existing systems and techniques may not operate correctly in environments with such electrical interference causing erroneous measurements and incorrect determinations regarding the position of a target. Additionally, other environmental conditions, such as temperature, may affect the accuracy of measurements obtained with different components. Accordingly, it may be desirable to utilize techniques in connection with proximity sensing which are robust when used in environments having electrical interference and other environmental conditions affecting the reliability and accuracy of measurements obtained in connection with the proximity sensing system.

SUMMARY OF THE INVENTION

In accordance with one aspect of the invention is a method for determining a first measured value comprising: generating a first voltage signal having a first amplitude; providing the first voltage signal as a driving signal to the inductive sensor; receiving a sensor current signal as a return signal output from the inductive sensor, said sensor current signal having an amplitude proportional to a proximity of a target to the inductive sensor; converting said sensor current signal to a corresponding second voltage signal having a second amplitude; and using a differential measuring technique to determine said first measured value in accordance with relative amplitudes of said first voltage signal and said second voltage signal, said first measured value being associated with the proximity of the target to the inductive sensor. The first measured value may be an admittance value, Y, of the inductive sensor. Y may be represented as:

$$\frac{Es}{Er * Reference}$$

and wherein Er is said first amplitude of said first voltage signal, Es is said second amplitude of said second voltage signal and Reference is a known reference value of a component. The component may be a reference resistor. The method may also include: providing a switch that switches between said first voltage signal and said second voltage signal; measuring said first voltage signal to determine said first amplitude when said switch is in a first setting; and measuring said second voltage signal to determine said second amplitude when said switch is in a second different setting, and wherein said driving signal is continuously provided to said inductive sensor while measuring said second voltage signal. The method may also include providing a sensor receiver which senses said sensor current signal and converts said sensor current signal to said corresponding second voltage signal. The first measured value may be determined using only said relative amplitudes and a known reference value of a single reference component included in said sensor receiver. The single reference component may be a resistor through which said sensor current signal flows, said second magnitude of said second voltage signal being proportional to said known reference value and an amplitude of said second current signal. The first voltage signal may be a sine wave at a selected frequency. The sensor receiver may operate as a transconductance amplifier having a non-inverting input, and said return signal from said inductive sensor may be held at a same voltage as said non-inverting input of said sensor receiver. The driving signal may be provided to said inductive sensor on a driving signal line and said return signal may be provided from said inductive sensor on a return signal line, said driving signal line and said return signal lines having substantially balanced termination impedances. The method may also include providing said reference resistor having a resistance value selected in accordance with an impedance of said inductive sensor. The method may also include providing a first proximity indicator value in accordance with said first measured value, said proximity indicating the proximity of the target to the inductive sensor. The method may also include providing a predetermined set of measurement values having corresponding proximity indicator values; and selecting said first proximity indicator value as one of said corresponding proximity indicator values having an associated predetermined measurement value in accordance with said first measured value. The driving signal and said return signal may be transmitted over a shielded twisted pair cable. The driving signal and the return signal may be configured to have a potential value other than zero. The driving signal and the return signal may be configured to half a supply voltage. If a wire fault occurs in any signal line transmitting said driving signal or said return signal and causes said any signal line to fail to ground, there may be failure of said inductive sensor, said failure of said inductive sensor being a trigger event for detecting a failed signal line. The driving signal applied to said inductive sensor may have said first amplitude providing a full available excitation voltage, and said driving signal continuously provided to said inductive sensor may provide for switching between said second voltage signal and said first voltage signal without incurring a transient settling time associated with reconnecting said inductive sensor to said driving signal.

In accordance with another aspect of the invention is an inductive sensing apparatus for determining a first measured value comprising: a sensor driver generating a first voltage signal having a first amplitude; an inductive sensor having the first voltage signal as a driving signal; a sensor receiver receiving a sensor current signal as a return signal output from the inductive sensor, said sensor current signal having an amplitude proportional to a proximity of a target to the inductive sensor, said sensor receiver converting said sensor current signal to a corresponding second voltage signal having a second amplitude; and a component that performs a differential measuring technique to determine said first measured value in accordance with relative amplitudes of said first voltage signal and said second voltage signal, said first measured value being associated with the proximity of the target to the inductive sensor. The first measured value may be an admittance value, Y, of the inductive sensor. Y may be represented as:

$$\frac{Es}{Er * Reference}$$

and wherein Er is said first amplitude of said first voltage signal, Es is said second amplitude of said second voltage signal and Reference is a known reference value of a component. The component may be a reference resistor. The apparatus may also include a switch that switches between said first voltage signal and said second voltage signal, and wherein said first voltage signal is measured to determine said first amplitude when said switch is in a first setting, said second voltage signal is measured to determine said second amplitude when said switch is in a second different setting, and said driving signal is continuously provided to said inductive sensor while measuring said second voltage signal. The apparatus may also include a sensor receiver which senses said sensor current signal and converts said sensor current signal to said corresponding second voltage signal. The first measured value may be determined using only said relative amplitudes and a known reference value of a single reference component included in said sensor receiver. The single reference component may be a resistor through which said sensor current signal flows, said second magnitude of said second voltage signal being proportional to said known reference value and an amplitude of said second current signal. The first voltage signal may be a sine wave at a selected frequency. The sensor receiver may operate as a transconductance amplifier having a non-inverting input, and said return signal from said inductive sensor may be held at a same voltage as said non-inverting input of said sensor receiver. The driving signal may be provided to said inductive sensor on a driving signal line and said return signal may be provided from said inductive sensor on a return signal line, said driving signal line and said return signal lines having substantially balanced termination impedances. The reference resistor may have a resistance value selected in accordance with an impedance of said inductive sensor. A first proximity indicator value may be provided in accordance with said first measured value, said proximity indicating the proximity of the target to the inductive sensor. The apparatus may also include a predetermined set of measurement values stored in a memory having corresponding proximity indicator values, wherein said first proximity indicator value is selected as one of said corresponding proximity indicator values having an associated predetermined measurement value in accordance with said first measured value. The driving signal and said return signal may be transmitted over a shielded twisted pair cable. The driving signal and said return signal may be configured to have a potential value other than zero. The driving signal and said return signal may be configured to half a supply voltage. If a wire fault occurs in any signal line transmitting said driving signal or said return signal and causes said any signal line to fail to ground, there may be failure of said inductive sensor, said failure of said inductive sensor being a trigger event for detecting a failed signal line. The driving signal applied to said inductive sensor may have said first amplitude providing a full available excitation voltage, and said driving signal continuously provided to said inductive sensor may provide for switching between said second voltage signal and said first voltage signal without incurring a transient settling time associated with reconnecting said inductive sensor to said driving signal.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
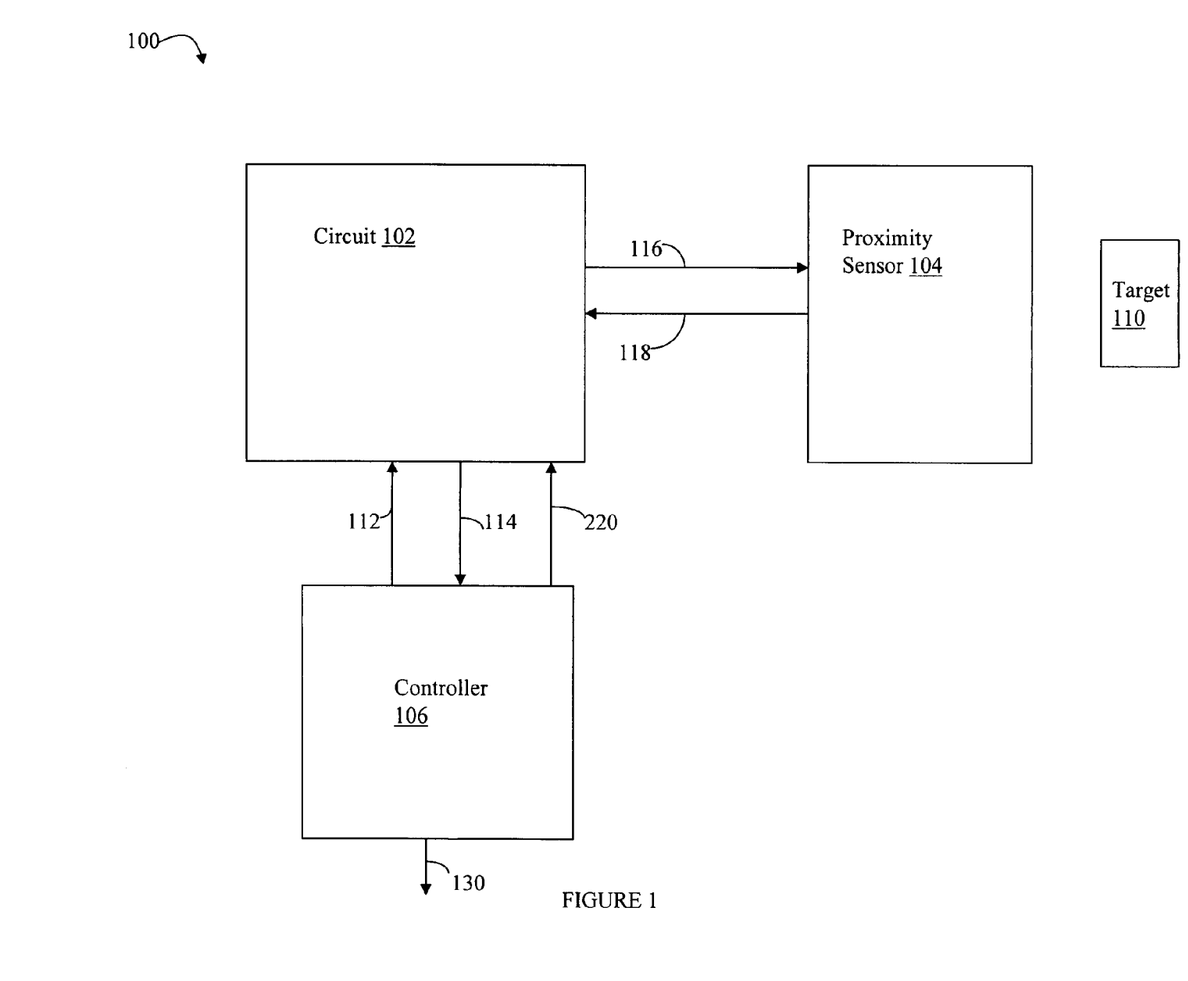
FIG. 1 is an example of an embodiment of a functional block diagram of components used in connection with the techniques described herein for proximity sensing.

Referring now to FIG. 1, shown is an example of an embodiment of a functional block diagram of components used in connection with the techniques described herein for proximity sensing. The example 100 includes a circuit 102, a controller 106, a proximity sensor 104 and a target 110. The controller 106 produces an analog electrical signal on line 112 which is an input to the circuit 102. The circuit 102 generates a driving signal on line 116 which is input to the proximity sensor 104. The proximity sensor generates a return signal on line 118 to the circuit 102. The circuit 102 produces an output analog signal on line 114 to the controller 106. The circuit 102 converts a sensor current signal received on line 118 from the sensor 104 to an equivalent voltage signal which is returned to the controller on line 114. Based on the signal returned on line 114, processing may be performed by the controller in connection with making a determination regarding proximity of the target 110 to the sensor 104. The controller 106 outputs a final result signal 130 regarding the proximity of target 110 and the sensor 104. The signals transmitted on line 220 may be control signals to components included in the circuit 102. Additional details regarding the components and signals are described in more detail herein.

A proximity sensor may be used in connection with determining the proximity of a target object to the sensor without making physical contact. In the embodiment described herein, the proximity sensor is an inductive proximity sensor. Inductive proximity sensors operate under the electrical principle of inductance. Inductance may be characterized as the phenomenon where a fluctuating current, which by definition has a magnetic component, induces an electromotive force (emf) in a target object. When a metal object, such as target 110, moves into the inductive proximity sensor's field of detection, the inductance of the proximity sensor changes. The target object may be composed of metallic material. The manner in which the inductance changes with respect to proximity of the target may vary with the materials comprising the target object.

In an embodiment, the target may comprised of one or more different materials which may be magnetic, non-magnetic, or a combination of both. Magnetic materials cause a change in the inductance of the sensor due to a change in the magnetic permeability of the material exposed to the magnetic field associated with the sensor current flow. Non-magnetic materials may cause a loss of sensor energy sensed as an increase in the equivalent series resistance of the sensor due to eddy currents induced in the target. A combination target may make use of both of these effects in accordance with the varying possible compositions of the target materials.

In one embodiment, the target object may be made of a metallic material causing the inductance to increase as the proximity of the target object to the proximity sensor also increases. As the target object moves, the magnetic characteristics of the sensor 104 change in accordance with variations in target object position. Such changes in target object position also cause variations in the signal output returned to the controller. Monitoring such variations over time as determined by the controller may be used in sensing changes to target object position as well as in determining what particular position or state a target object is in. In one aspect, the target 110 may be characterized as magnetically coupled to the proximity sensor 104 affecting the inductance of an inductor included in the sensor 104.

In one embodiment, the controller 106 may output a signal on line 112, also referred to as an excitation signal, which is a sine wave at a frequency of 600 Hz. It should be noted that other frequencies may also be used in connection with the techniques described herein. The signal lines 116 and 118 may be included in an interconnection cable, such as a shielded twisted pair cable. The circuit 102 may output a signal on line 116 which is routed through the proximity sensor 104 and returned on line 118. Components included in the circuit 102 convert the return current signal on line 118 to a proportional voltage signal which is returned to the controller 106 on line 114 for processing. The controller 106 may perform processing in connection with the voltage signal using techniques described herein for determining a proximity of the target object 110 from the proximity sensor 104.

The controller 106 may perform multiple processing functions. In one embodiment, the controller 106 may generate the analog signal on line 112 and measure the return voltage signal on line 114. The controller 106 may also control operation of components in the circuit 102. Additionally, as mentioned above, the controller 106 may perform processing using one or more of the measured return signals on line 114 to produce result signal 130. Although FIG. 1 illustrates a controller 106 as the component for providing the signal on line 112 and reading and processing the output signals on line 114, it will be appreciated by those skilled in the art that the functionality performed by 106 may be embodied in one or more physical components.

The particular range of distances between the proximity sensor 104 and the target 110, and associated states or proximity determinations, may vary with application and embodiment. For example, in one embodiment, the components of FIG. 1 may be used in the aviation industry. The components of FIG. 1 may be used on airplanes in a wide variety of application to detect whether a cargo door is open or closed, to determine the positioning and sequencing of landing gear, and the like. As one example, the gap between the sensor 104 and the target 110 may be in the range of 0.025 inches and 0.1 inches. In another application, the range of distances between the sensor 104 and target 110 may be different. Additionally, the number of states and the value or range of values associated with a particular state may vary. For example, in one application making a determination as to whether a door is open or closed, the states may be "open" and "closed". A very small range of distance values between the target 110 and the sensor 104 may be associated with the "closed" state. Otherwise, a determination is made that the door is "open". In order to make the determination as to what state the door is in, empirical testing may be performed to determine which measurements using the techniques described herein are associated with corresponding distance values for the particular configuration and environment. This is also described in more detail herein.

Within an airplane or other environment in which the configuration of FIG. 1 may operate, there may be electrical interference and other environmental factors. The techniques used in connection with determining the proximity of the target may take into account such factors in order to increase the robustness of the system to correctly sense changes in magnetic characteristics, such as current changes with respect to time, indicating distance changes between the target object 110 and the sensor 104. As such, the techniques described herein utilize a differential measurement technique. Additionally, the technique limits the dependencies on electronic components by calculating sensor admittance, Y, in a way which is only dependent on a value of a single circuit element, and determining changes in target location in accordance with changes in Y values. Furthermore, the techniques described herein determine Y using measurements made without incurring any transient time associated with disconnecting and reconnecting components.

Figure 2:
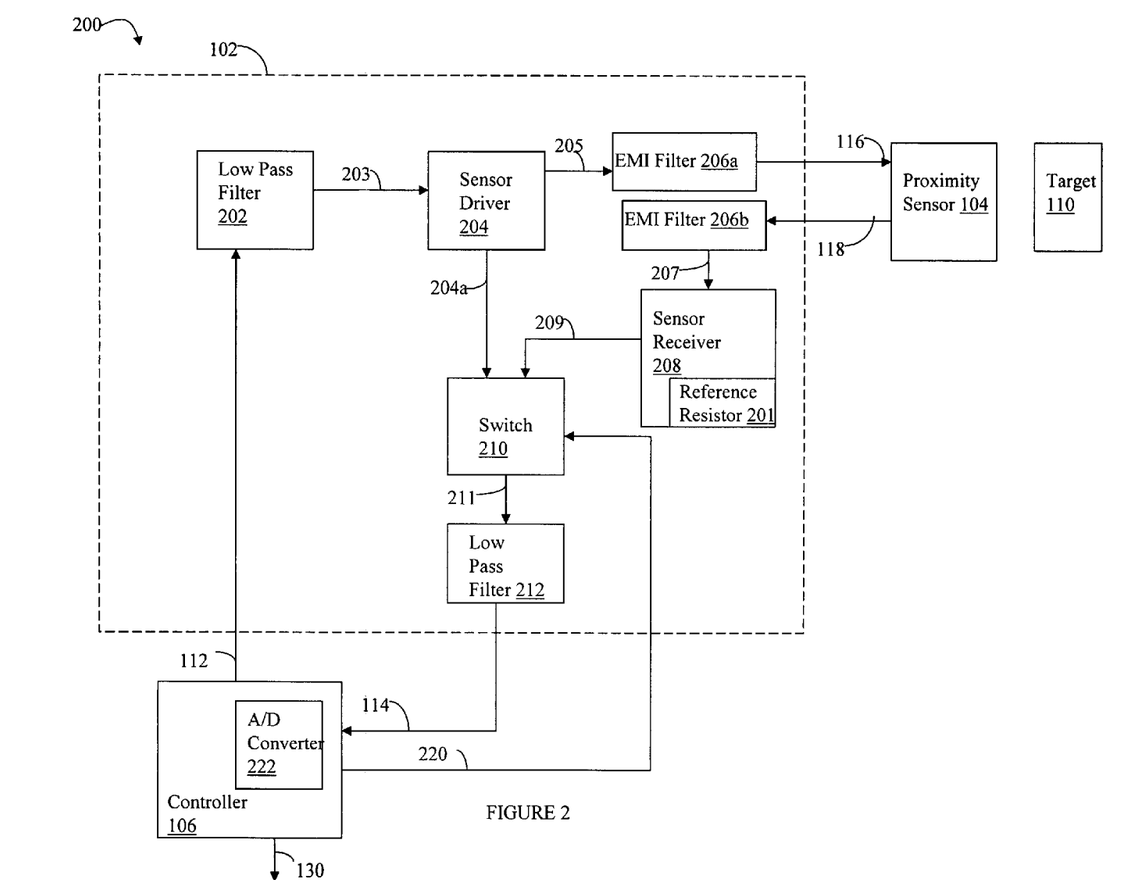
FIG. 2 is a more detailed example of components of FIG. 1.

Referring now to FIG. 2, shown is a more detailed example of some of the components of FIG. 1. The example 200 shows components that may be included in an embodiment of the circuit 102. Additionally, the example 200 shows the controller 106 as including an A/D converter 222. The A/D converter 222 samples the output voltages received as return signals on line 114. Using a Digital Fast Fourier Transform (FFT), the received sample values are converted into a digital number proportional to the amplitude of the measured signal at the operating frequency which, in one embodiment as described herein, is 600 Hz. It will be appreciated by those skilled in the art that other techniques may be used in connection with processing the received output voltages.

The circuit 102 is illustrated as including a low pass filter 202, a sensor driver 204, EMI filters 206a and 206b, a sensor receiver 208, a switch 210, and low pass filter 212. The sensor receiver 208 also includes a reference resistor 201. The input signal, which may be the sine wave as described in connection with FIG. 1, is transmitted over line 112 as an input to the low pass filter 202. The filter 202 may remove any unwanted harmonic frequencies to ensure a sinusoidal signal to the sensor driver 204. Filter 202 generates an output signal on line 203 which is input to the sensor driver 204. The sensor driver 204 supplies the desired sensor current and is stable with a complex load impedance. In one embodiment, the sensor driver 204 provides a signal of approximately one volt peak at a current of approximately 50 mA peak. The output signal of the sensor driver 204 on line 205 is routed through an EMI filter 206*a* and then to the proximity sensor 104 over line 116. The signal is then routed through the sensor 104 and back to another EMI filter 206*b* over line 118. The filtered signal produced by the EMI filter 206*b* is an input to the sensor receiver 208 which generates an output voltage signal to the switch 210 over line 209.

As described above, the lines 116 and 118 may be included in a single interconnection cable such as a shielded twisted pair cable. The EMI filters 206*a* and 206*b* may be used to prevent external signals from interfering with operation of the circuit. The sensor receiver 208 converts the received sensor current to a proportional voltage. The sensor receiver 208 may operate as a transconductance amplifier in performing the current to voltage conversion. As will be described in more detail, a precision resistor, the reference resistor 201, may be used in an embodiment of the feedback circuit of the sensor receiver 208. In one embodiment described herein, the reference resistor 201 is accurately known and used in determining the Y values for detecting the position of the target 110 with respect to the sensor 104.

Another input to the switch 210 is the output signal of the sensor driver 204 over line 204*a*. The same signal is output over lines 205 and 204*a*. The switch 210 may be used to select which of the input signals from 204*a* and 209 pass through as an output signal in line 211 to the low pass filter 212 and then to the A/D converter 222 on line 114. As will be described in more detail in following paragraphs, the placement of the reference resistor 201 in the sensor receiver 208 and the use of the switch 210 allows for the A/D converter to sample signals from either the sensor driver 204 or the output of the sensor receiver 208. The foregoing may be performed while also having a full available excitation voltage from the sensor driver 204 applied to the sensor 104 and without incurring the transient settling time that may otherwise be associated with disconnecting the sensor 104 from the sensor driver. In other words, configuration described herein provides for maximizing the signal applied at the sensor 104 and keeping the sensor 104 excited even when the switch 110 is selected to output the sensor driver signal from line 204*a*.

In connection with determining Y, the sensor admittance, two measurements may be used. Er is the first measurement and is the amplitude of the output signal from the sensor driver 204. Er is the measurement value on lines 204*a* and 205, and the amplitude of the output signal from the switch 210 on line 211 when appropriately selected for the input on line 204*a*. The second measurement is Es, the amplitude of the output signal from the sensor receiver 208. Es is the measurement value on line 209 and the amplitude of output signal from the switch 210 on line 211 when appropriately selected for the input on line 209. Es, the amplitude of the sensor receiver output voltage signal, may be represented as follows:

$$Es = Esd * Reference * Y * \alpha \qquad \text{EQUATION 1}$$

where Esd is the amplitude of the sensor driver output voltage signal;

α is the gain on the filter 202; and

Reference is the known value of the reference resistor 201.

Er may be represented as follows:

$$Er = Esd * \alpha \qquad \text{EQUATION 2}$$

Based on the foregoing, the ratio Es/Er may be represented as:

$$\frac{Es}{Er} = \frac{Esd * Reference * Y * \alpha}{Esd * \alpha} \qquad \text{EQUATION 3}$$

which reduces to $$\frac{Es}{Er} = Reference * Y \qquad \text{EQUATION 4}$$

and solving for Y, the sensor admittance:

$$Y = \frac{Es}{Er * Reference} \qquad \text{EQUATION 5}$$

The foregoing shows that Y is dependent on the value of the reference resistor 201 and not on the values of other circuit variables. Additionally, the foregoing ratio may be characterized as a differential technique. Any noise or interfering signals tend to be introduced equally into the measurements Er and Es. In the ratio, such interfering signal have the effect of canceling out each other.

As the sine wave produced by the sensor driver 204 drives the sensor 104, the sensor receiver 208 is held at a particular voltage. The current from the proximity sensor 104 as received on line 207 by the sensor receiver 208 (e.g., sensor current) is forced through the reference resistor 201 so that the voltage on line 209, Es, is the sensor current * the value of the reference resistor 201. (e.g, V=I*R). The voltage of the signal on line 209, Es, is proportional to the sensor current. The sensor current is in turn proportional to the frequency and the impedance of the sensor 104 which is determined by the distance between the target 110 and the proximity sensor 104.

By monitoring changes in the foregoing Y value determined at different points in time, changes in positioning of the target 110 with respect to the proximity sensor 104 may be determined. Also, by determining a particular Y value at a point in time, a determination may be made regarding the proximity of a target to the sensor at that point in time.

The controller 106 may receive voltage signals on line 114 alternating between Es and Er values depending on the setting of switch 210. In one embodiment, the controller 106 may perform processing to calculate the above-referenced Y values at different points in time as each pair of Es and Er values are sampled. The controller 106 may then compare the calculated Y values to predetermined or calibrated Y values associated with different distances between the sensor 104 and target 110. Each of the predetermined or calibrated Y values may have a corresponding state in accordance with the position of the target relative to the sensor. The controller 106 may perform processing for calculating Y values and comparing these calculated values to predetermined Y values to determine the corresponding state. In this case, the result signal 130 may correspond to a proximity indicator value, such as a boolean value, indicating the detected corresponding state. The predetermined or calibrated Y values may be stored in a form of memory included in the controller 106 or at another storage location from which the controller 106 may access the necessary data values.

In another embodiment, the calculation of the Y values and/or the comparison to the predetermined Y values may be done by other components not included in the controller 106. In such cases, the result signal 130 may vary from that just described in accordance with the processing performed by the controller 106 and other components which may receive the result signal 130. For example, the controller 106 may calculate the Y values and output digital or analog output signals on 130 proportional to the calculated Y values.

Figure 3A:
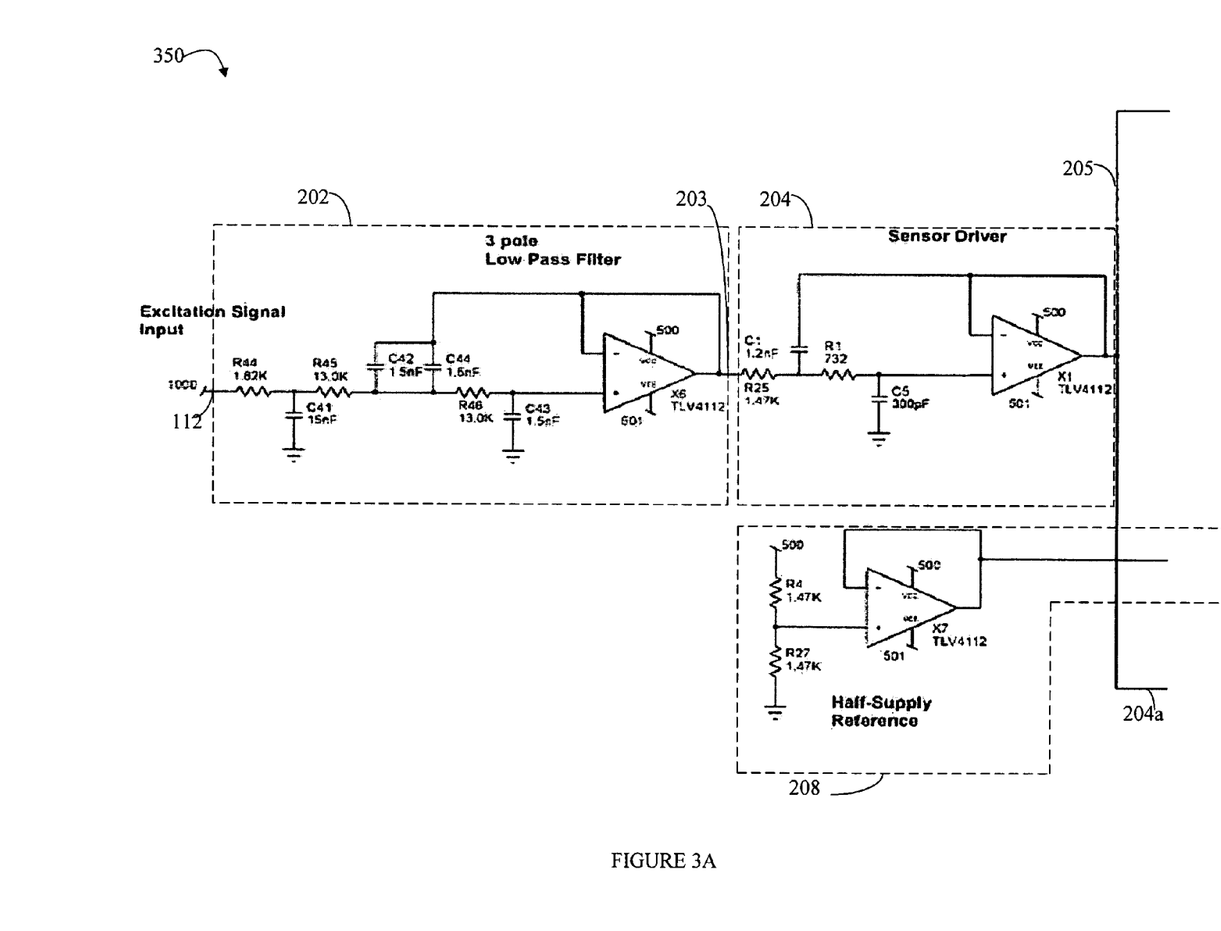
FIGS. 3A and 3B are examples of an embodiment of a circuit diagram of components from FIG. 2.
Figure 3B:
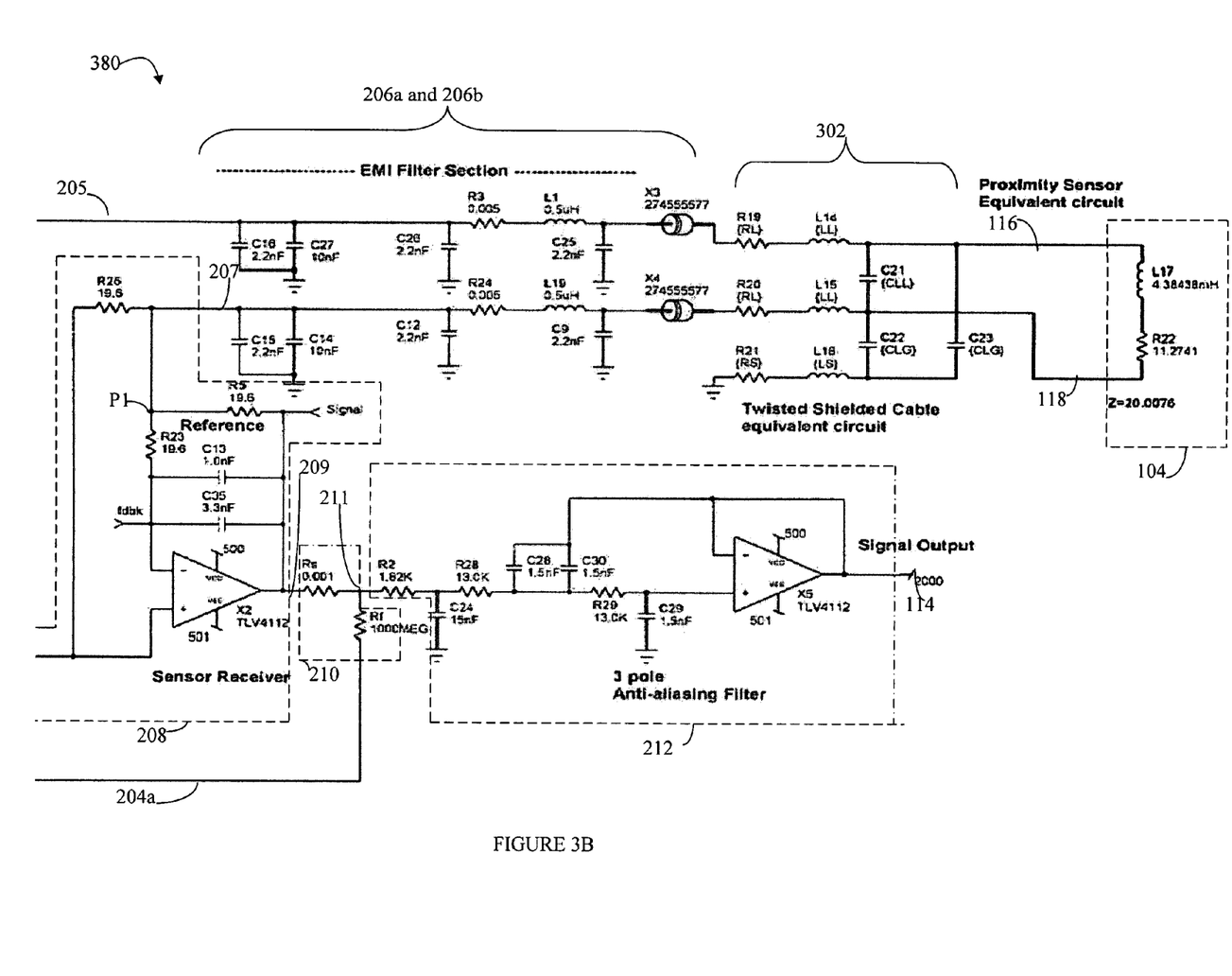

Referring now to FIGS. 3A and 3B, shown is an example of a schematic of the components illustrated in connection with FIG. 2. It should be noted that FIGS. 3A and 3B are a schematic of components that may be included in an embodiment of the circuit 102 and proximity sensor 104 of FIG. 2. For the sake of simplicity of illustration, other elements from FIG. 2 have been omitted.

It should also be noted that the schematic of FIGS. 3A and 3B was produced using the circuit simulation package, SPICE. As such, certain elements illustrated and/or described herein in connection with FIGS. 1 and 2 may be represented in FIGS. 3A and 3B by an equivalent circuit or other element.

Referring now to FIG. 3A, the example 350 shows a first portion of the schematic. In this example 350, the excitation signal 112 is input to the filter 202. The filter 202 in this example is a three pole low pass filter produces an output on line 203 to the sensor driver 204. The filter 202 filters out the high harmonics producing a sine wave output as described elsewhere herein. The low pass filter of 202 in this example is configured as a unity gain. The sensor driver 204 produces an output signal on lines 205 and 204a. The sensor driver 204 also has unity gain. It should be noted that particular values for components R1, R25, C1 and C5 are provided herein. As will be appreciated by those skilled in the art, values for the foregoing components are selected for use in accordance with the particular sensor, cable, and the like, to provide stability for the sensor driver's circuit. An embodiment may have to empirically adjust values for these components for stability in accordance with variations to the sensor, cabling, and the like. Also included in 350 is a portion of the sensor receiver 208. The portion of 208 in 350 is a half supply reference circuit which divides a supply voltage in half. As will be further described in connection with FIG. 3B, the half supply reference voltage as generated by the half supply reference circuit of 350 is an input to the operational amplifier (op-amp) of the sensor receiver. In one embodiment, the Vcc=5 volts so that the half supply reference voltage is 2.5 volts.

Referring now to FIG. 3B, the signal on line 205 is input to an EMI filter 206a. In this example, 380, the EMI filters 206a and 206b are collectively labeled EMI filter section. However, functionally, there are two separate filters as will now be described. The EMI filter 206a is represented as including the components C16, C27, C26, R3, L1, C25, and X3. The EMI filter 206b is represented as including the components C15, C14, C12, R24, L19, C9, and X4. The interconnection cable connecting the EMI filters 206a and 206b to the proximity sensor 104 is represented as element 302. The simulation software provides a representation of the cable as illustrated. As illustrated, the element 302 is the electrical simulation of the shielded twisted pair cable. The input signal to the sensor 104 is over line 116 and passes through the proximity sensor 104 having inductor L17 and R22 with an associated impedance as indicated by Z in 104. The output signal of the sensor 104 is transmitted on line 118, through the cable 302, and the EMI filter 206b. The EMI filter 206b generates a signal on line 207 which is input to the sensor receiver 208.

The sensor receiver 208 includes an op-amp X2 having as an input to its positive node the half supply reference voltage as generated by the half supply reference circuit of 350. The other input to the inverting node of the op-amp X2 is the signal output on line 207 from the proximity sensor 104. In connection with the op-amp X2 and its circuit, the inverting node input is held at the same voltage as the non-inverting node. In this embodiment, the positive node of X2 is at half the supply reference voltage so the op-amp X2 and its circuit operate to hold the voltage at the point noted fdbk at the same voltage as the output of X7 of FIG. 3A. As described herein, the sensor receiver operates as a transconductance amplifier that converts the sensor current from the sensor 104 to a proportional voltage.

As the output of X1 varies sinusoidally, the current moves back and forth between X1 and X2 as will now be described. If X1 is positive or more than half the supply reference voltage, then X2 is sinking the current rather than sourcing the current. In this case, the current travels a path from the Vcc 500 of X1 over 205 to the sensor 104 and over 207 to the junction or node denoted P1 in 208. From P1, the current flows through resistor R5 (which is the reference resistor 201) into the output node of X2, and into the negative terminal of the power supply 501 Vee of X2. If X1 is negative or below the half supply reference voltage, then X2 sources current rather than sinking current. In this instance, the current travels from the Vcc 500 of X2 to the Vee 501 of X1 over the same path as just described in the reverse direction. In summary, when X1 is more than the half supply reference voltage, X1 will source current from Vcc 500 of the sensor driver 204. When X1 is less than the half supply reference voltage, X2 will source current and X1 will sink the current.

The current signal from the proximity sensor 104 (e.g., sensor current) received on line 207 by the sensor receiver 208 at the junction noted P1 is forced through R5 (which is the reference resistor 201) so that the voltage measured on line 209, Es, is the measured sensor current * the value of R5, the reference resistor 201 (e.g, V=I*R). The voltage of the signal on line 209, Es, at the output of op-amp X2 is proportional to the sensor current. The sensor current is in turn proportional to the frequency and the impedance of the sensor 104. The impedance of the sensor 104 is determined by the distance between the target 110 and the proximity sensor 104. The impedance Z of the sensor 104 may also be represented as the inverse of the sensor admittance value, Y, as described elsewhere herein. Thus, a distance between the target 110 and the proximity sensor 104 may be determined by examining Y or Z associated with the proximity sensor 104. Also, changes in distance may be determined in accordance with changes at different points in time in the Y or Z values associated with the proximity sensor.

The output of X1 (e.g., the sensor driver output signal) is a sine wave exciting the sensor 104 and the output of X2 is a sine wave having an amplitude which is proportional to the sensor current.

It should be noted that the components R23, R26, C13 and C35 included in op-amp X2's circuit are used in connection with providing the op-amp circuit with stability in the presence of the EMI filters and cabling used. Selection of values for these components may vary in an embodiment and may be determined by performing standard stability analysis.

The switch 210 is represented in this example with the two resistors Rs and Rf. It should be noted that the control signal 220 to the switch 210 has been omitted for clarity of illustration. The control signal 220 may be used in changing the value of the resistance from Rs to Rf and vice versa causing a toggling of the output on 211 from the switch 210 between the switch input signal on 209 (e.g., sensor receiver) and 204a (e.g., sensor driver). Rs and Rf are representative of the resistances of a single pole double pole switch allowing the input of the filter 212 to be connected to either the sensor driver signal on 204a (e.g., Rf being less than 1 ohm and Rs being greater than 1 Megaohm), or the sensor receiver output signal on 209 (e.g, Rf being greater than 1 Megaohm and Rs being less than 1 ohm). The switch 210 in an embodiment may be a toggle switch. An embodiment may include any one of a variety of other types of switches such as, for example, a digitally controlled switch or an optically controlled switch.

The output on 211 of the switch 210 passes through the filter 212 which in this example is a three pole anti-aliasing filter. The output voltage signals from 212 are represented as output voltage signals on 114 which are then input to the A/D converter of the controller 106. As described elsewhere herein, the controller 106 may then process these voltage signals to determine Y values. The determination of Y at a point in time may be compared with different predetermined Y values associated with different corresponding distances between the target 110 and the proximity sensor 104 as described above.

Based on the foregoing in this embodiment, the value of the reference resistor 201 is the sole circuit component value used in determining the relationship between Es and Er for a given sensor current value. A precision resistor, such as represented by R5, may be used as the reference resistor 201 in the feedback circuit of the sensor receiver. Since the value of the reference resistor 201 is accurately known, the conversion factor of the sensor current to an equivalent voltage, Es, is precisely known. The value of the reference resistor 201 (e.g., R5 in FIG. 3B) may be selected to be equal to the sensor impedance at its minimum value. The foregoing provides for alternatively sampling between Es and Er values using the switch without disconnecting the sensor 104 from the sensor driver signal as may be the case with some existing systems and techniques. Each time the sensor is reconnected to its excitation or driving signal, there is a transient settling time incurred proportional to the L/R time constant of the circuit of the sensor 104. In applications and systems where a very fast response to sensor changes is needed, the foregoing latency or transient settling time may be unacceptable. In the foregoing configuration, values of Es and Er are measured without disconnecting the sensor 104 from its excitation signal as generated by the sensor driver 204. The result is that no settling or transient waiting time is incurred when obtaining the measurements herein and the system can detect sensor changes with a shorter latency period than in other existing systems.

The arrangement described herein provides for full available excitation or driving signal voltage being applied across the sensor 104 resulting in the best possible signal to noise ratio for a given power supply voltage. Existing systems may have an arrangement in which the sensor is connected in series to some intervening element (e.g., another resistor or capacitor) between the sensor and the sensor driver. As a result, some of the available power supply voltage is lost across this intervening series element prior to reaching the sensor 104 resulting in a lower signal to the sensor 104. In the foregoing description, the sensor receiver 208 is referenced to one half of the power supply voltage. When the sensor driver is at the maximum supply voltage, the output signal of the sensor receiver is equal and opposite (e.g., near ground or the negative supply voltage). Conversely, when the sensor driver is at the minimum supply voltage, the sensor receiver output is near the maximum supply voltage. In this manner, the peak to peak voltage across the sensor 104 is approximately equal to the total supply voltage providing the best possible signal to noise ratio for a given power supply voltage.

In connection with the embodiment of the sensor receiver 208, the potential at the non-inverting input node of X2 is held at one half of the power supply voltage by the half supply reference circuit of FIG. 3A. In this manner, a single power supply voltage can be used while ensuring that both leads (e.g., 116 and 118) of the sensor are terminated in a very low impedance to establish a balanced impedance termination of the sensor 104.

In electrically noisy environments, as may be found in aircraft operating environments, external noise may be effectively removed or rejected using a twisted wire pair. For the noise rejection advantage afforded by the twisted wire pair to be optimally exploited, the termination impedances of both the input and return lines 116 and 118 of the sensor may be substantially matched or substantially balanced. In the foregoing arrangement, the substantially symmetrical impedance values may be achieved by selecting the reference resistor 201 (e.g., R5) to have a resistance value approximately the same as the sensor's impedance (e.g., Z=20.0076 in FIG. 3B).

The foregoing has both the driving signal line 116 and the return signal line 118 of the sensor 104 configured to half of the power supply voltage (e.g., having a potential other than zero). If one of the foregoing signal lines fails to ground, the sensor 104 will stop working and the occurrence of the non-functional sensor may be used as a trigger event to allow for detection of the failed signal line. Accordingly, a problem with one or both of lines 116 and 118 is easily detectable. In the foregoing, both signal lines remain at half the supply potential therefore if there is a short in one or both wires, the shorted wire will fail to ground. The sensor will be non-functional and one or both wires may be checked to determine which has failed to ground. Failure to detect the signal lines 116 and/or 118 failing to ground allows any noise in the ground path to be unknowingly injected into the system and associated measurements.

Figure 4:
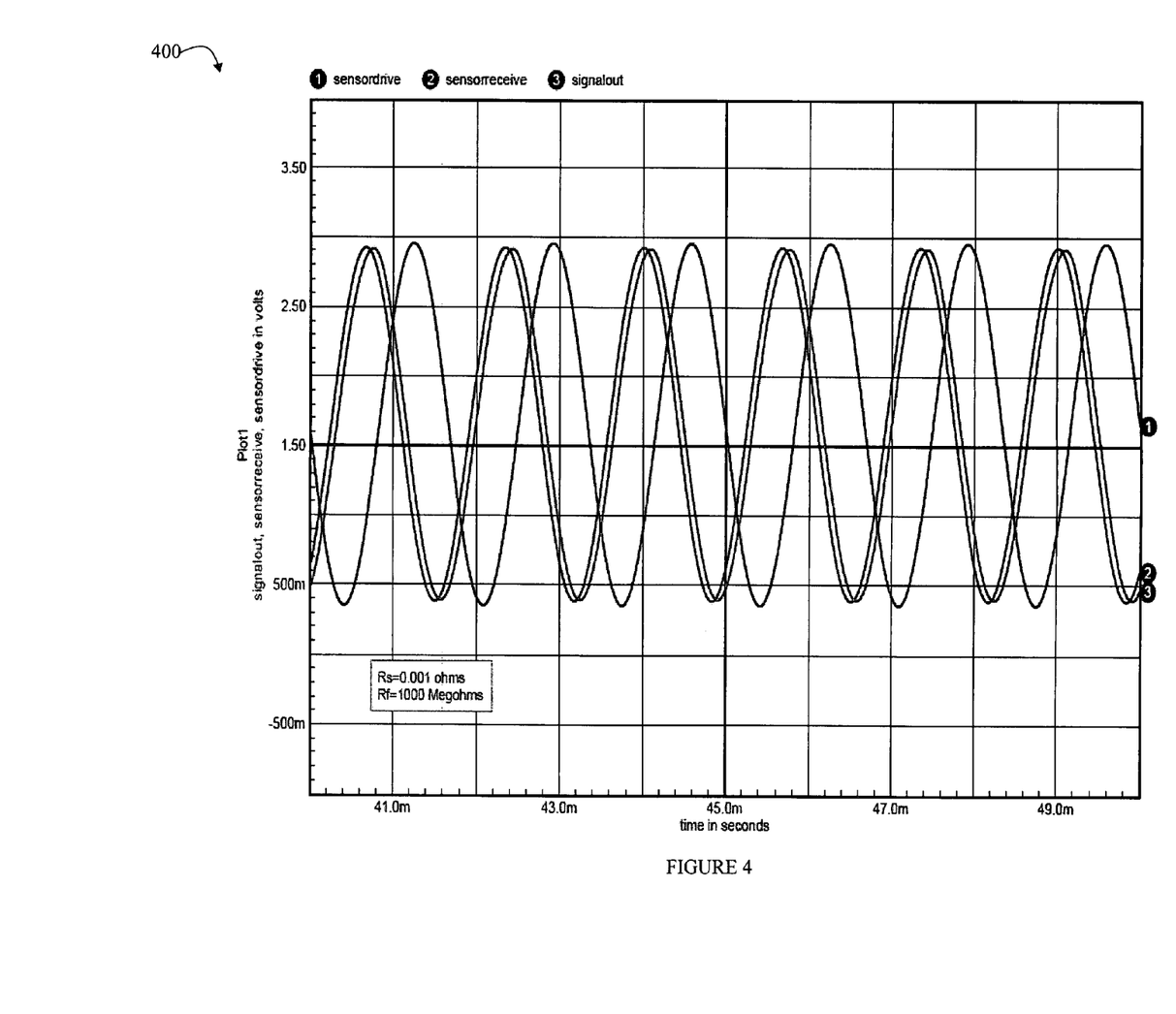
FIGS. 4 and 5 are timing diagrams with illustrative waveforms associated with operation of the circuit diagram of FIGS. 3A and 3B.
Figure 5:
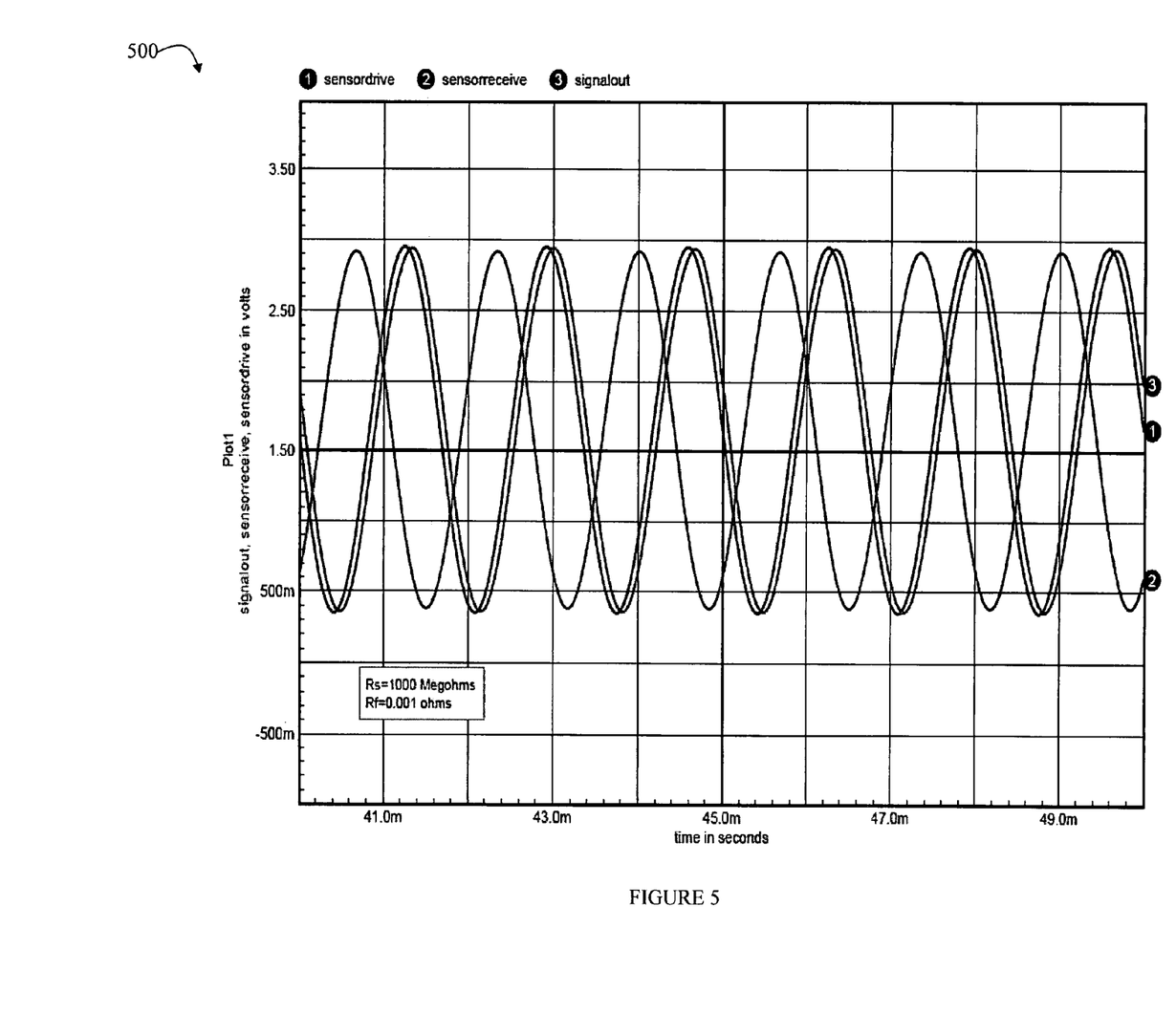

Referring now to FIGS. 4 and 5, shown are timing diagrams with illustrative waveforms associated with operation of the circuit diagram of FIGS. 3A and 3B. FIG. 4 includes an illustration 400 showing operation of the circuit and waveforms for the sensor driver output signal (e.g., Er, denoted as curve "1" in the illustration 400), the sensor receiver output signal (e.g. Es, denoted as curve "2" in the illustration 400), and the output signal of switch 210 (e.g., denoted as curve "3" in the illustration 400) when the switch 210 is selected to generate an output signal on line 211 to be the sensor receiver output signal. The foregoing switch selection is illustrated by the waveforms associated with curves 2 and 3 being synchronized. Note that the sensor driver output signal at a point in time may be generally characterized as equal and opposite to that of the sensor receiver output signal.

FIG. 5 includes an illustration 500 showing operation of the circuit of FIGS. 3A and 3B when the switch 210 is selected to generate an output signal on line 211 to be the sensor driver output signal. This switch selection is illustrated by the waveforms associated with curves 1 and 3 being synchronized. Note that the sensor receiver output signal of curve 2 illustrates the point that the sensor is continuously excited even when the switch is selected to output the sensor driver signal.

The foregoing utilizes a differential measuring technique in which an electrical interference or noise introduced into both the Es and Er measurements is effectively canceled out in the determination of Y measurements. The foregoing describes a configuration in which the measurements have a dependency on only a single reference resistor. The Es and Er measurements used to calculate the Y values may be obtained without disconnecting the sensor from the sensor driver and while also applying a full excitation voltage across the sensor.

It should be noted that an embodiment may purchase a high quality precision or calibration resistor as the reference resistor 201. For the techniques described herein, other components in the configuration do not have to be of the same quality and known to the same accuracy since values associated with these other circuit elements do not affect the determination of Er, Es and thus Y measurements. The foregoing may reduce costs associated with an embodiment utilizing the techniques described herein.

As will be appreciated by those skilled in the art, described herein is a reference resistor. Although a resistor may be used in an embodiment due to the fact that resistors have precise tolerances, an embodiment may also use an inductor or capacitor rather than the reference resistor 201.

Prior to operation and use, predetermined or calibrated Y values may be determined in accordance with particular threshold values associated with the different states (e.g., "near" and "far", or "open" and "closed") that may be represented in an embodiment. Rather than associate Y values with each state since Y=1/Z, an embodiment may associate different Z (impedance) values with each state. The A/D converter illustrated herein digitizes the voltage values or samples and may perform, for example, the FFT analysis generating real and imaginary components. The predetermined or calibrated values may include the real and imaginary components. It should be noted that an embodiment may determine multiple sets of predetermined values. Each set of predetermined values may be associated with different environmental or operating conditions. For example, a first set of predetermined values may be associated with a first temperature or temperature range. A second set of predetermined values may be associated with a second different temperature or temperature range. During operation in the aircraft, the temperature may be obtained and used by the controller, or other component performing the processing, to select the appropriate table of predetermined values.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining a first measured value comprising:
    generating a first voltage signal having a first amplitude;
    providing the first voltage signal as a driving signal to the inductive sensor;
    receiving a sensor current signal as a return signal output from the inductive sensor, said sensor current signal having an amplitude proportional to a proximity of a target to the inductive sensor;
    converting said sensor current signal to a corresponding second voltage signal having a second amplitude; and
    using a differential measuring technique to determine said first measured value, said first measured value being proportional to a ratio of relative amplitudes of said first voltage signal and said second voltage signal, said first measured value being associated with the proximity of the target to the inductive sensor.

2. The method of claim 1, wherein said first measured value is an admittance value, Y, of the inductive sensor.

3. The method of claim 1, further comprising:
    providing a sensor receiver which senses said sensor current signal and converts said sensor current signal to said corresponding second voltage signal.

4. The method of claim 3, wherein said sensor receiver operates as a transconductance amplifier having a non-inverting input, and said return signal from said inductive sensor is held at a same voltage as said non-inverting input of said sensor receiver.

5. The method of claim 1, wherein said first voltage signal is sine wave at a selected frequency.

6. The method of claim 1, wherein said driving signal is provided to said inductive sensor on a driving signal line and said return signal is provided from said inductive sensor on a return signal line, said driving signal line and said return signal lines having substantially balanced termination impedances.

7. The method of claim 1, further comprising:
    providing a first proximity indicator value in accordance with said first measured value, said proximity indicating the proximity of the target to the inductive sensor.

8. The method of claim 7, further comprising:
    providing a predetermined set of measurement values having corresponding proximity indicator values; and
    selecting said first proximity indicator value as one of said corresponding proximity indicator values having an associated predetermined measurement value in accordance with said first measured value.

9. The method of claim 1, wherein said driving signal and said return signal are transmitted over a shielded twisted pair cable.

10. The method of claim 1, wherein said driving signal and said return signal are configured to have a potential value other than zero.

11. The method of claim 10, wherein said driving signal and said return signal are configured to half a supply voltage.

12. The method of claim 10, wherein if a wire fault occurs in any signal line transmitting said driving signal or said return signal and causes said any signal line to fail to ground, there is failure of said inductive sensor, said failure of said inductive sensor being a trigger event for detecting a failed signal line.

13. A method for determining a first measured value comprising:
    generating a first voltage signal having a first amplitude;
    providing the first voltage signal as a driving signal to the inductive sensor;
    receiving a sensor current signal as a return signal output from the inductive sensor, said sensor current signal having an amplitude proportional to a proximity of a target to the inductive sensor;
    converting said sensor current signal to a corresponding second voltage signal having a second amplitude; and
    using a differential measuring technique to determine said first measured value in accordance with relative amplitudes of said first voltage signal and said second voltage signal, said first measured value being associated with the proximity of the target to the inductive sensor, wherein said first measured value is an admittance value, Y, of the inductive sensor, and wherein Y is represented as:

$$\frac{Es}{Er * Reference}$$

and wherein Er is said first amplitude of said first voltage signal, Es is said second amplitude of said second voltage signal and Reference is a known reference value of a component.

14. The method of claim 13, wherein said component is a reference resistor.

15. The method of claim 14, further comprising:
providing said reference resistor having a resistance value selected in accordance with an impedance of said inductive sensor.

16. A method for determining a first measured value comprising:
generating a first voltage signal having a first amplitude;
providing the first voltage signal as a driving signal to the inductive sensor;
receiving a sensor current signal as a return signal output from the inductive sensor, said sensor current signal having an amplitude proportional to a proximity of a target to the inductive sensor;
converting said sensor current signal to a corresponding second voltage signal having a second amplitude;
using a differential measuring technique to determine said first measured value in accordance with relative amplitudes of said first voltage signal and said second voltage signal, said first measured value being associated with the proximity of the target to the inductive sensor;
providing a switch that switches between said first voltage signal and said second voltage signal;
measuring said first voltage signal to determine said first amplitude when said switch is in a first setting; and
measuring said second voltage signal to determine said second amplitude when said switch is in a second different setting, and
wherein said driving signal is continuously provided to said inductive sensor while measuring said second voltage signal.

17. The method of claim 16, wherein said driving signal applied to said inductive sensor has said first amplitude providing a full available excitation voltage, and said driving signal continuously provided to said inductive sensor provides for switching between said second voltage signal and said first voltage signal without incurring a transient settling time associated with reconnecting said inductive sensor to said driving signal.

18. A method for determining a first measured value comprising:
generating a first voltage signal having a first amplitude;
providing the first voltage signal as a driving signal to the inductive sensor;
receiving a sensor current signal as a return signal output from the inductive sensor, said sensor current signal having an amplitude proportional to a proximity of a target to the inductive sensor;
converting said sensor current signal to a corresponding second voltage signal having a second amplitude;
using a differential measuring technique to determine said first measured value in accordance with relative amplitudes of said first voltage signal and said second voltage signal, said first measured value being associated with the proximity of the target to the inductive sensor; and
providing a sensor receiver which senses said sensor current signal and converts said sensor current signal to said corresponding second voltage signal, wherein said first measured value is determined using only said relative amplitudes and a known reference value of a single reference component included in said sensor receiver.

19. The method of claim 18, wherein said single reference component is a resistor through which said sensor current signal flows, said second magnitude of said second voltage signal being proportional to said known reference value and an amplitude of said second current signal.

20. An inductive sensing apparatus for determining a first measured value comprising:
a sensor driver generating a first voltage signal having a first amplitude;
an inductive sensor having the first voltage signal as a driving signal;
a sensor receiver receiving a sensor current signal as a return signal output from the inductive sensor, said sensor current signal having an amplitude proportional to a proximity of a target to the inductive sensor, said sensor receiver converting said sensor current signal to a corresponding second voltage signal having a second amplitude; and
a component that performs a differential measuring technique to determine said first measured value, said first measured value being proportional to a ratio of relative amplitudes of said first voltage signal and said second voltage signal, said first measured value being associated with the proximity of the target to the inductive sensor.

21. The apparatus of claim 20, wherein said first measured value is an admittance value, Y, of the inductive sensor.

22. The apparatus of claim 20, further comprising:
a sensor receiver which senses said sensor current signal and converts said sensor current signal to said corresponding second voltage signal.

23. The apparatus of claim 22, wherein said sensor receiver operates as a transconductance amplifier having a non-inverting input, and said return signal from said inductive sensor is held at a same voltage as said non-inverting input of said sensor receiver.

24. The apparatus of claim 20, wherein said first voltage signal is sine wave at a selected frequency.

25. The apparatus of claim 20, wherein said driving signal is provided to said inductive sensor on a driving signal line and said return signal is provided from said inductive sensor on a return signal line, said driving signal line and said return signal lines having substantially balanced termination impedances.

26. The apparatus of claim 20, wherein a first proximity indicator value is provided in accordance with said first measured value, said proximity indicating the proximity of the target to the inductive sensor.

27. The apparatus of claim 26, further comprising:
a predetermined set of measurement values stored in a memory having corresponding proximity indicator values, wherein said first proximity indicator value is selected as one of said corresponding proximity indicator values having an associated predetermined measurement value in accordance with said first measured value.

28. The apparatus of claim 20, wherein said driving signal and said return signal are transmitted over a shielded twisted pair cable.

29. The apparatus of claim 20, wherein said driving signal and said return signal are configured to have a potential value other than zero.

30. The apparatus of claim 29, wherein said driving signal and said return signal are configured to half a supply voltage.

31. The apparatus of claim 29, wherein if a wire fault occurs in any signal line transmitting said driving signal or said return signal and causes said any signal line to fail to ground, there is failure of said inductive sensor, said failure of said inductive sensor being a trigger event for detecting a failed signal line.

32. An inductive sensing apparatus for determining a first measured value comprising:
- a sensor driver generating a first voltage signal having a first amplitude;
- an inductive sensor having the first voltage signal as a driving signal;
- a sensor receiver receiving a sensor current signal as a return signal output from the inductive sensor, said sensor current signal having an amplitude proportional to a proximity of a target to the inductive sensor, said sensor receiver converting said sensor current signal to a corresponding second voltage signal having a second amplitude; and
- a component that performs a differential measuring technique to determine said first measured value in accordance with relative amplitudes of said first voltage signal and said second voltage signal, said first measured value being associated with the proximity of the target to the inductive sensor, wherein said first measured value is an admittance value, Y, of the inductive sensor, and wherein Y is represented as:

$$\frac{Es}{Er * Reference}$$

and wherein Er is said first amplitude of said first voltage signal, Es is said second amplitude of said second voltage signal and Reference is a known reference value of a second component.

33. The apparatus of claim 32, wherein said second component is a reference resistor.

34. The apparatus of claim 33, wherein said reference resistor has a resistance value selected in accordance with an impedance of said inductive sensor.

35. An inductive sensing apparatus for determining a first measured value comprising:
- a sensor driver generating a first voltage signal having a first amplitude;
- an inductive sensor having the first voltage signal as a driving signal;
- a sensor receiver receiving a sensor current signal as a return signal output from the inductive sensor, said sensor current signal having an amplitude proportional to a proximity of a target to the inductive sensor, said sensor receiver converting said sensor current signal to a corresponding second voltage signal having a second amplitude;
- a component that performs a differential measuring technique to determine said first measured value in accordance with relative amplitudes of said first voltage signal and said second voltage signal, said first measured value being associated with the proximity of the target to the inductive sensor; and
- a switch that switches between said first voltage signal and said second voltage signal, and wherein said first voltage signal is measured to determine said first amplitude when said switch is in a first setting, said second voltage signal is measured to determine said second amplitude when said switch is in a second different setting, and said driving signal is continuously provided to said inductive sensor while measuring said second voltage signal.

36. The apparatus of claim 35, wherein said driving signal applied to said inductive sensor has said first amplitude providing a full available excitation voltage, and said driving signal continuously provided to said inductive sensor provides for switching between said second voltage signal and said first voltage signal without incurring a transient settling time associated with reconnecting said inductive sensor to said driving signal.

37. An inductive sensing apparatus for determining a first measured value comprising:
- a sensor driver generating a first voltage signal having a first amplitude;
- an inductive sensor having the first voltage signal as a driving signal;
- a sensor receiver receiving a sensor current signal as a return signal output from the inductive sensor, said sensor current signal having an amplitude proportional to a proximity of a target to the inductive sensor, said sensor receiver converting said sensor current signal to a corresponding second voltage signal having a second amplitude;
- a component that performs a differential measuring technique to determine said first measured value in accordance with relative amplitudes of said first voltage signal and said second voltage signal, said first measured value being associated with the proximity of the target to the inductive sensor; and
- a sensor receiver which senses said sensor current signal and converts said sensor current signal to said corresponding second voltage signal, wherein said first measured value is determined using only said relative amplitudes and a known reference value of a single reference component included in said sensor receiver.

38. The apparatus of claim 37, wherein said single reference component is a resistor through which said sensor current signal flows, said second magnitude of said second voltage signal being proportional to said known reference value and an amplitude of said second current signal.

* * * * *